(12) United States Patent
Lin et al.

(10) Patent No.: US 12,051,356 B2
(45) Date of Patent: Jul. 30, 2024

(54) DISPLAY CONTROL SYSTEM AND DISPLAY WITH UNIVERSAL SERIAL BUS (USB) CONTROL

(71) Applicant: REALTEK SEMICONDUCTOR CORPORATION, Hsinchu (TW)

(72) Inventors: Yuh-Wey Lin, Hsinchu (TW); Chun-Hao Huang, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 18/079,911

(22) Filed: Dec. 13, 2022

(65) Prior Publication Data
US 2023/0196977 A1    Jun. 22, 2023

(30) Foreign Application Priority Data

Dec. 16, 2021   (TW) .................................. 110147145

(51) Int. Cl.
*G06F 13/42* (2006.01)
*G09G 3/20* (2006.01)
*G06F 3/14* (2006.01)

(52) U.S. Cl.
CPC ....... *G09G 3/2096* (2013.01); *G06F 13/4282* (2013.01); *G06F 3/1423* (2013.01); *G06F 2213/0016* (2013.01); *G06F 2213/0042* (2013.01); *G09G 2320/0626* (2013.01); *G09G 2320/066* (2013.01); *G09G 2320/0666* (2013.01)

(58) Field of Classification Search
CPC ......... G09G 3/2096; G09G 2320/0626; G09G 2320/066; G09G 2320/0666; G06F 13/4282; G06F 2213/0016; G06F 2213/0042; G06F 3/1423
See application file for complete search history.

(56) References Cited

U.S. PATENT DOCUMENTS

2003/0189560 A1* 10/2003 Kang ...................... G09G 5/003
                                                                         348/E5.119
2010/0180055 A1*  7/2010 Lyon ...................... G06F 3/038
                                                                         710/316

FOREIGN PATENT DOCUMENTS

CN            107707848 A     2/2018

OTHER PUBLICATIONS

OA letter of a counterpart TW application (appl. No. 110147145) mailed on Jun. 17, 2022.

* cited by examiner

Primary Examiner — Adam J Snyder
(74) Attorney, Agent, or Firm — WPAT, P.C

(57) ABSTRACT

A display control system includes a display and an electronic device. The display includes a display panel, a USB hub, and a display control circuit. The USB hub receives a control signal in a first format through a USB interface. The display control circuit receives a control signal in a second format from the USB hub and controls the display panel according to the control signal in the second format. The electronic device includes an input device, a USB driver circuit, and a processor circuit. The input device generates an input signal. The USB driver circuit is electrically coupled to the USB hub of the display through the USB interface. The processor circuit generates an original control signal according to the input signal and controls the USB driver circuit to transmit the control signal in the first format through the USB interface.

17 Claims, 7 Drawing Sheets

DISPLAY CONTROL SYSTEM AND DISPLAY WITH UNIVERSAL SERIAL BUS (USB) CONTROL

BACKGROUND OF THE INVENTION

1. Field of the Invention

The present invention generally relates to displays (which may sometimes be referred to as monitors), and, more particularly, to display control systems.

2. Description of Related Art

FIG. 1 shows a conventional electronic system 100 including an electronic device 110 and a display 120. The electronic device 110 includes an input device 111 and a graphic driver circuit 116 and runs the operating system 112. The display 120 includes a display control circuit 122 (e.g., a scaler integrated circuit (IC)) and a display panel 124. When the display 120 needs adjustment (e.g., adjustment of brightness, contrast, or color), or a specific function of the display 120 needs to be switched on or off, the application 114 run on the operating system 112 controls the graphic driver circuit 116 to transmit the control signal to the display control circuit 122 of the display 120 through the display data channel (DDC) 130 included in the video stream interface (e.g., a video interface such as DisplayPort (DP) or high definition multimedia interface (HDMI)), and then the display control circuit 122 controls the display panel 124 according to the control signal.

The electronic system 100 has the following disadvantages: (1) poor compatibility between the electronic device 110 and the display 120, because they are connected through the graphic driver circuit 116 and the DDC 130, but, unfortunately, the graphic driver circuit 116 is not unique and universal in terms of hardware (meaning that a variety of graphic driver circuits are available on the market) as well as subject to frequent firmware update; and (2) time-consuming and inconvenience when adjusting multiple displays 120, because the electronic system 100 can only adjust one display 120 at a time.

SUMMARY OF THE INVENTION

In view of the issues of the prior art, an object of the present invention is to provide display control systems and displays, so as to make an improvement to the prior art.

According to one aspect of the present invention, a display control system is provided. The display control system includes a display and an electronic device. The display includes a display panel, a USB hub, and a display control circuit. The USB hub is configured to receive a control signal in a first format through a USB interface. The display control circuit is electrically coupled to the display panel and the USB hub and configured to receive a control signal in a second format from the USB hub and control the display panel according to the control signal in the second format. The electronic device is electrically coupled to the display through the USB interface and includes an input device, a USB driver circuit, and a processor circuit. The input device generates an input signal. The USB driver circuit is electrically coupled to the USB hub of the display through the USB interface. The processor circuit is electrically coupled to the input device and the USB driver circuit and configured to generate an original control signal according to the input signal and control the USB driver circuit to transmit the control signal in the first format through the USB interface.

According to another aspect of the present invention, a display control system is provided. The display control system includes a display and an electronic device. The display includes a display panel and a display control circuit. The display control circuit is electrically coupled to the display panel and includes a USB hub control circuit which provides a USB port electrically coupled to a USB interface. The display control circuit receives a control signal in a first format through the USB interface and controls the display panel according to a control signal in a second format. The electronic device is electrically coupled to the display through the USB interface and includes an input device, a USB driver circuit, and a processor circuit. The input device generates an input signal. The USB driver circuit is electrically coupled to the display control circuit of the display through the USB interface. The processor circuit is electrically coupled to the input device and the USB driver circuit and configured to generate an original control signal according to the input signal and control the USB driver circuit to transmit the control signal in the first format through the USB interface.

According to still another aspect of the present invention, a display is provided. The display includes a display panel, a USB hub, and a display control circuit. The USB hub is configured to receive a control signal in a first format through a USB interface. The display control circuit is electrically coupled to the display panel and the USB hub and configured to receive a control signal in a second format from the USB hub and control the display panel according to the control signal in the second format.

The display control systems and the displays of the present invention use the USB interface as the control signal transmission interface. Because the hardware and firmware of the USB interface are quite stable (i.e., not updated frequently) and are backward compatible, compatibility is rarely an issue to the present invention. In addition, multiple displays can form a display network through the USB interface. In comparison with the prior art, the display control systems and the displays of the present invention can make the control of the display more convenient, as well as save time when controlling multiple displays.

These and other objectives of the present invention no doubt become obvious to those of ordinary skill in the art after reading the following detailed description of the preferred embodiments with reference to the various figures and drawings.

DETAILED DESCRIPTION OF THE EMBODIMENTS

The following description is written by referring to terms of this technical field. If any term is defined in this specification, such term should be interpreted accordingly. In addition, the connection between objects or events in the below-described embodiments can be direct or indirect provided that these embodiments are practicable under such connection. Said "indirect" means that an intermediate object or a physical space exists between the objects, or an intermediate event or a time interval exists between the events.

The disclosure herein includes display control systems and displays. On account of that some or all elements of the display control systems and displays could be known, the detail of such elements is omitted provided that such detail has little to do with the features of this disclosure, and that this omission nowhere dissatisfies the specification and enablement requirements. A person having ordinary skill in the art can choose components or steps equivalent to those described in this specification to carry out the present invention, which means that the scope of this invention is not limited to the embodiments in the specification.

Figure 1:
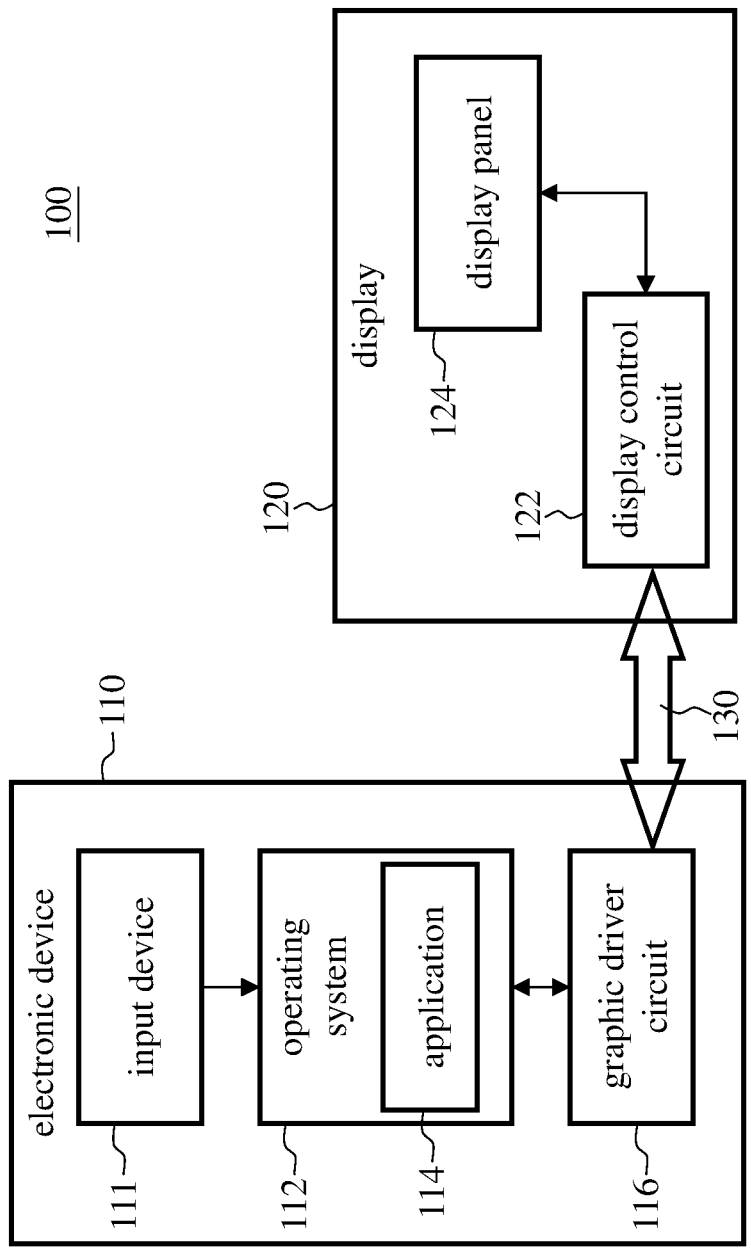
FIG. 1 is a conventional electronic system.
Figure 2:
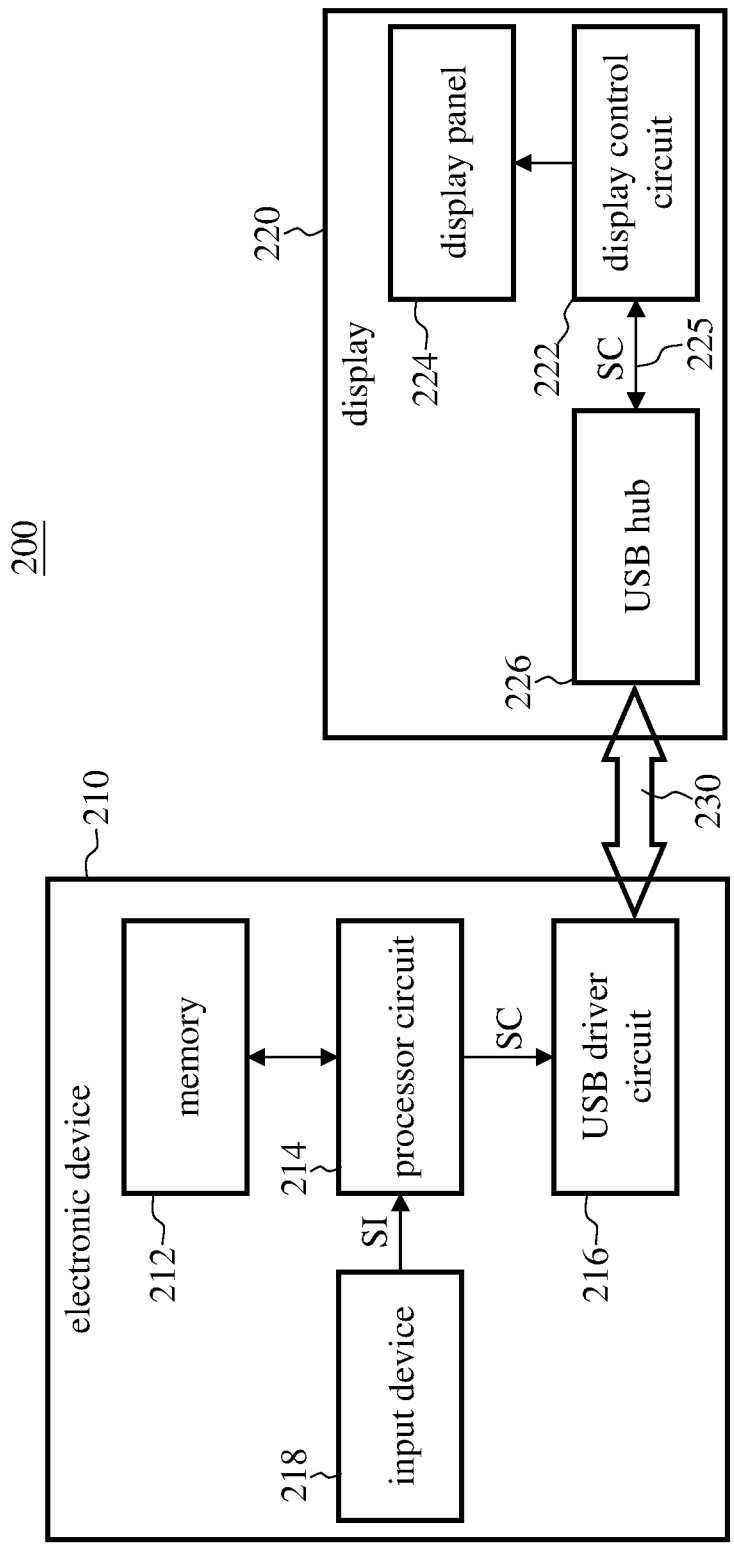
FIG. 2 is a functional block diagram of a display control system according to an embodiment of the present invention.

FIG. 2 is a functional block diagram of a display control system according to an embodiment of the present invention. The display control system 200 includes an electronic device 210 and a display 220. The electronic device 210 and the display 220 are connected through the USB interface 230. The electronic device 210 includes a memory 212, a processor circuit 214, a USB driver circuit 216, and an input device 218 (including but not limited to a keyboard, a mouse, and/or a microphone). The display 220 includes a display control circuit 222, a display panel 224, and a USB hub (USB circuit) 226. The USB hub 226 is built in the display 220 and can be used as a USB expansion port of the electronic device 210. Signals or data are transmitted between the display control circuit 222 and the USB hub 226 through an Inter-Integrated Circuit ($I^2C$) bus interface 225. In some embodiments, the display control circuit 222 and the USB hub 226 are arranged on the same circuit board, with the $I^2C$ bus interface 225 being the wires on the circuit board.

Figure 3:
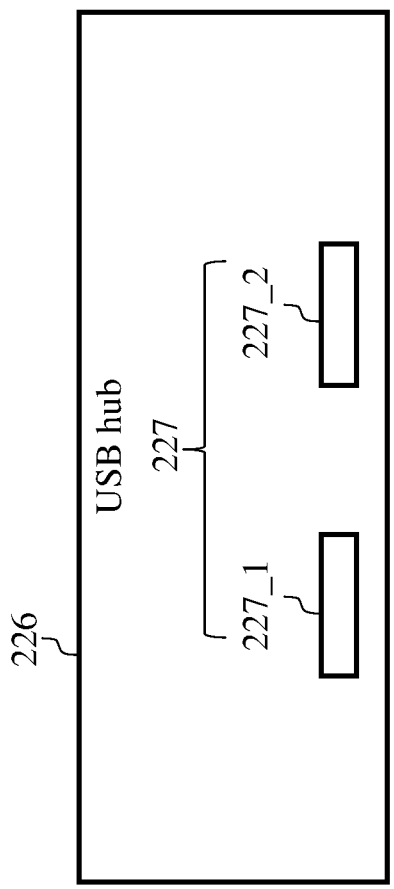
FIG. 3 is a schematic diagram of a USB hub according to an embodiment.

Reference is made to FIG. 3, which is a schematic diagram of the USB hub 226 according to an embodiment. The USB hub 226 includes a plurality of USB ports 227 (including a USB port 227_1 and a USB port 227_2), which can be USB interfaces or physical USB sockets. In some embodiments, the electronic device 210 and the display 220 are separate devices, and the USB interface 230 is a physical USB cable that connects the electronic device 210 and one of the USB ports (e.g., the USB port 227_1) of the USB hub 226.

Reference is made back to FIG. 2. The display control circuit 222, which is electrically coupled to the display panel 224, controls the display panel 224 to display images and controls the properties (e.g., the brightness, contrast, and/or color) of the display panel 224 according to the control signal. The USB hub 226 can convert the signals from the USB interface 230 to the $I^2C$ bus interface 225 and vice versa, namely, convert the signals from the USB format to the $I^2C$ bus format and vice versa. The conversion operation is well known to people having ordinary skill in the art, and its details are thus omitted for brevity.

The processor circuit 214 is electrically coupled to the memory 212 and the USB driver circuit 216. The memory 212 stores a plurality of program codes or program instructions which may be the operating system and application(s) of the electronic device 210. The processor circuit 214 carries out the functions of the electronic device 210 by executing the program codes or program instructions. The input device 218 generates the input signal SI in response to the user's operation(s). The processor circuit 214 converts the input signal SI into the control signal SC, and then controls the USB driver circuit 216 to first package the control signal SC into the USB format and then transmit the control signal SC in the USB format through the USB interface 230. After the USB hub 226 receives the control signal SC in the USB format through the USB interface 230, the USB hub 226 converts the control signal SC in the USB format into the control signal SC in the $I^2C$ bus format, and then transmits the control signal SC in the $I^2C$ bus format to the display control circuit 222 through the $I^2C$ bus interface 225. The display control circuit 222 adjusts the display 220 according to the control signal SC. In some embodiments, the display control circuit 222 includes a memory that stores a plurality of image parameters (e.g., the brightness parameter, the contrast parameter, the color parameter, etc.), and the display control circuit 222 adjusts the display panel 224 in response to the control signal SC, for example, by selecting one of the image parameters or changing at least one of the image parameters. In other words, the control signal SC (whether in the USB format or $I^2C$ bus format) can be a brightness adjustment signal, a contrast adjustment signal, or a color adjustment signal.

Figure 4:
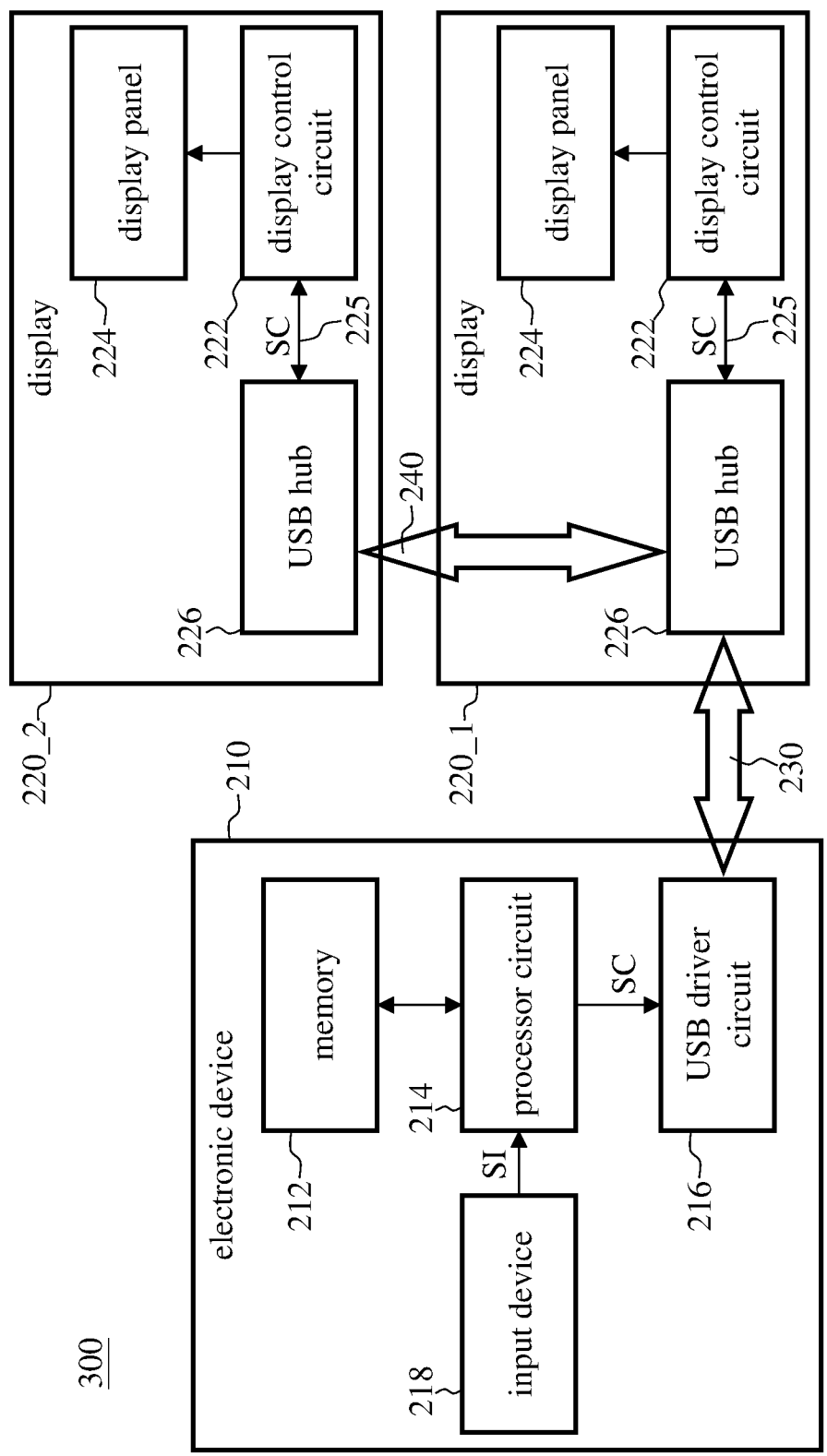
FIG. 4 is a functional block diagram of a display control system according to another embodiment of the present invention.

FIG. 4 is a functional block diagram of a display control system according to another embodiment of the present invention. The display control system 300 includes the electronic device 210, a display 220_1, and a display 220_2. The display 220_1 and the display 220_2 are identical to the display 220 of FIG. 3. In this embodiment, the USB hub 226 of the display 220_1 and the USB hub 226 of the display 220_2 are connected through the USB interface 240. Therefore, the control signal SC transmitted by the electronic device 210 to the display 220_1 through the USB interface 230 can be further transmitted to the display 220_2 through the USB interface 240. In some embodiments, the USB interface 240 is a physical USB cable that connects one of the USB ports (e.g., the USB port 227_2) of the USB hub 226 of the display 220_1 and one of the USB ports (e.g., the USB port 227_1) of the USB hub 226 of the display 220_2; as a result, a display network of multiple displays can be formed. In this way, the electronic device 210 can control multiple displays at once as long as it is electrically coupled to any display in the display network, which greatly improves the convenience of control and saves time.

Figure 5:
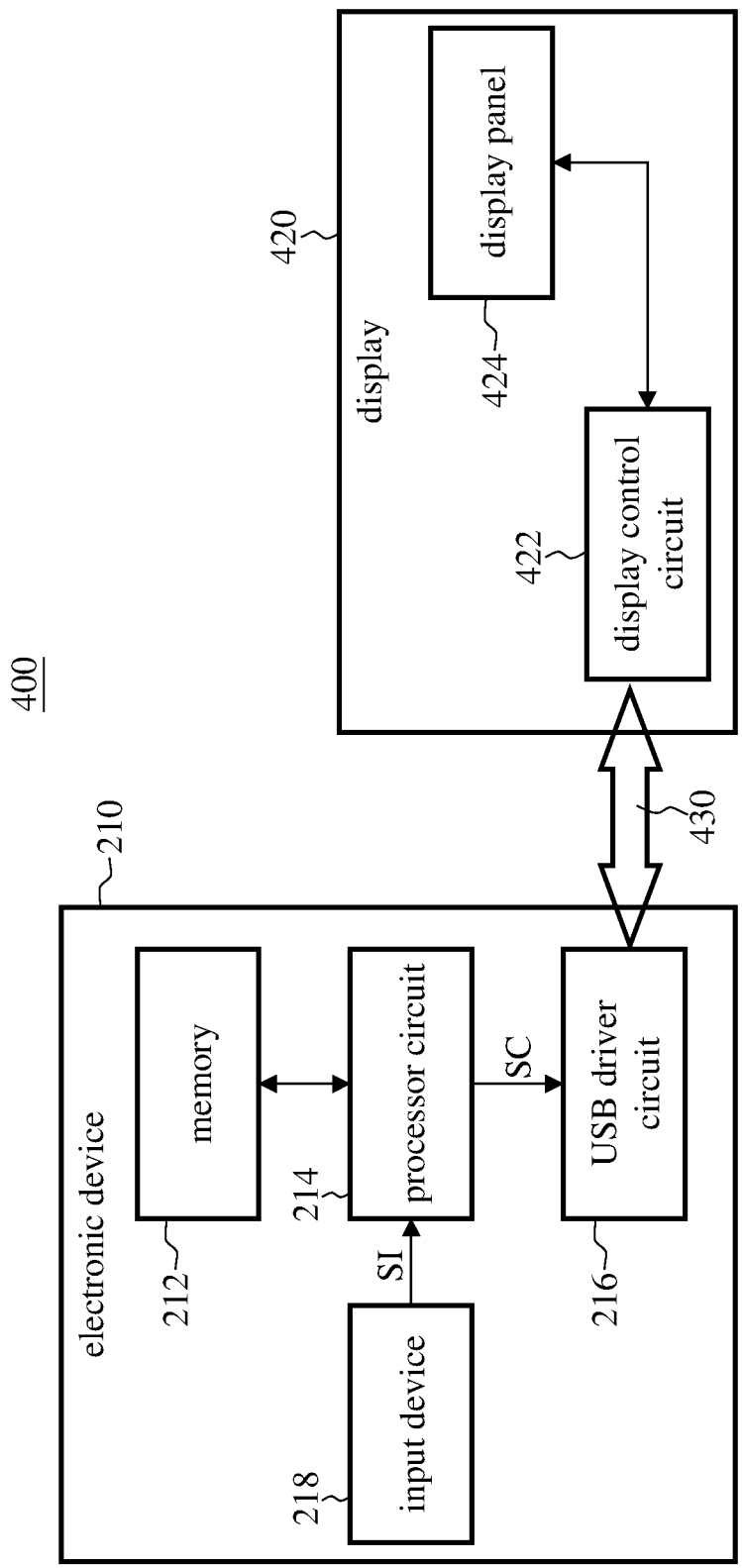
FIG. 5 is a functional block diagram of a display control system according to another embodiment of the present invention.

FIG. 5 is a functional block diagram of a display control system according to another embodiment of the present invention. The display control system 400 includes the electronic device 210 and a display 420, which are connected through the USB interface 430. The electronic device 210 of FIG. 4 is identical to the electronic device 210 of FIG. 2. The display 420 includes a display control circuit 422 and a display panel 424. The display control circuit 422, which is electrically coupled to the display panel 424, controls the display panel 424 to display images.

Figure 6:
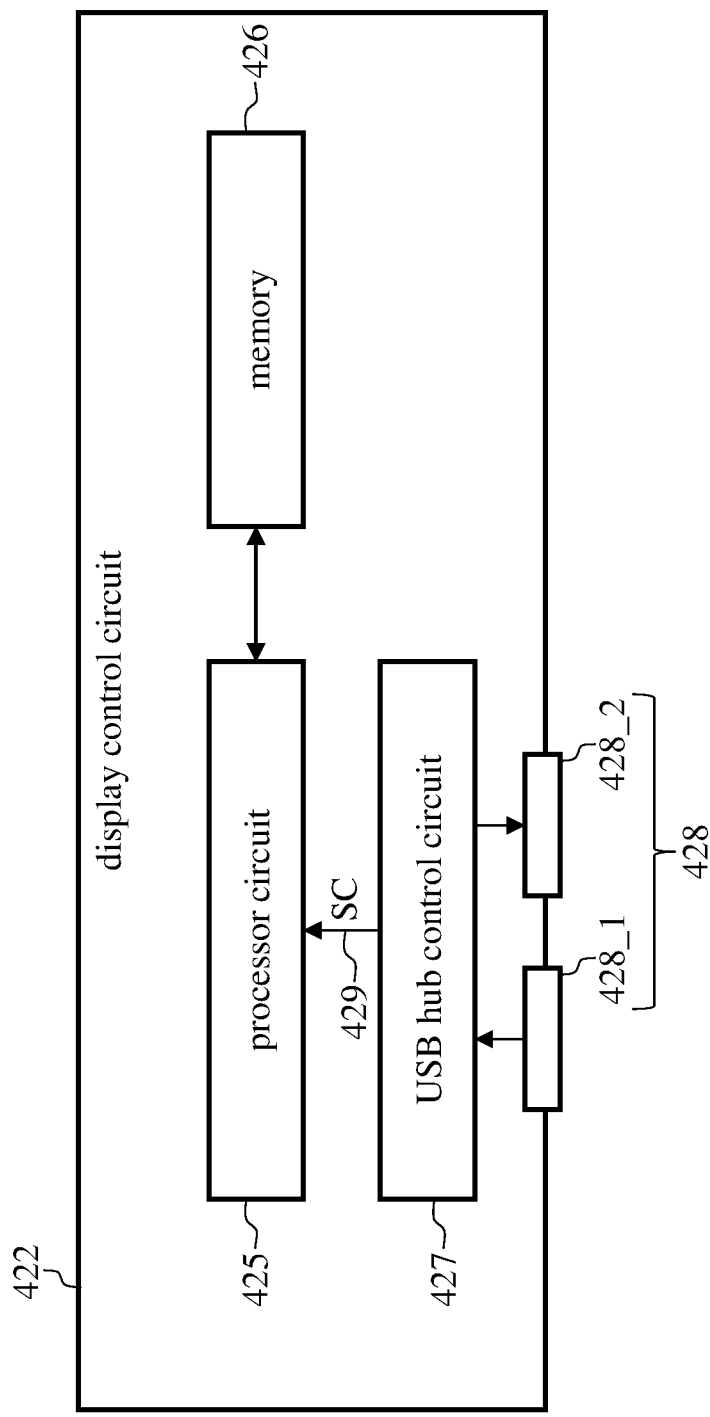
FIG. 6 is a functional block diagram of a display control circuit according to an embodiment of the present invention.

FIG. 6 shows a functional block diagram of the display control circuit according to an embodiment of the present invention. The display control circuit 422 includes a processor circuit 425, a memory 426, and a USB hub control circuit 427. The processor circuit 425 is electrically coupled to the memory 426 and the USB hub control circuit 427. The USB hub control circuit 427 provides a plurality of USB ports 428 (including a USB port 428_1 and a USB port 428_2), which can be USB interfaces. In some embodiments, the USB port 428_1 and the USB port 428_2 each include some pins (not shown) of the display control circuit 422, and these pins are electrically coupled to the physical USB sockets through the wires on the circuit board (not shown). Signals (e.g., the control signal SC) or data are transmitted between the processor circuit 425 and the USB hub control circuit 427 through the I$^2$C bus interface 429. In other words, the USB hub control circuit 427 can convert the signals from the USB interface to the I$^2$C bus interface and vice versa, namely, convert the signals from the USB format to the I$^2$C bus format and vice versa. In other words, the USB hub control circuit 427 can convert the control signals in the USB format into the control signals in the I$^2$C bus format. The processor circuit 425 receives the control signal SC through the I$^2$C bus interface 429. The memory 426 can store the aforementioned image parameters. The display control circuit 422 adjusts the display panel 424 in response to the control signal SC, for example, by selecting one of the image parameters or changing at least one of the image parameters.

In some embodiments, the electronic device 210 and the display 420 are separate devices, and the USB interface 430 is a physical USB cable that connects the electronic device 210 and one of the USB ports (e.g., the USB port 428_1) of the display control circuit 422.

Because the display control circuit 422 has a built-in USB hub control circuit 427, the USB driver circuit 216 of the electronic device 210 can be electrically coupled to the display control circuit 422 through the USB interface 430. That is, the display control circuit 422 can directly receive the control signal SC through the USB interface 430.

Figure 7:
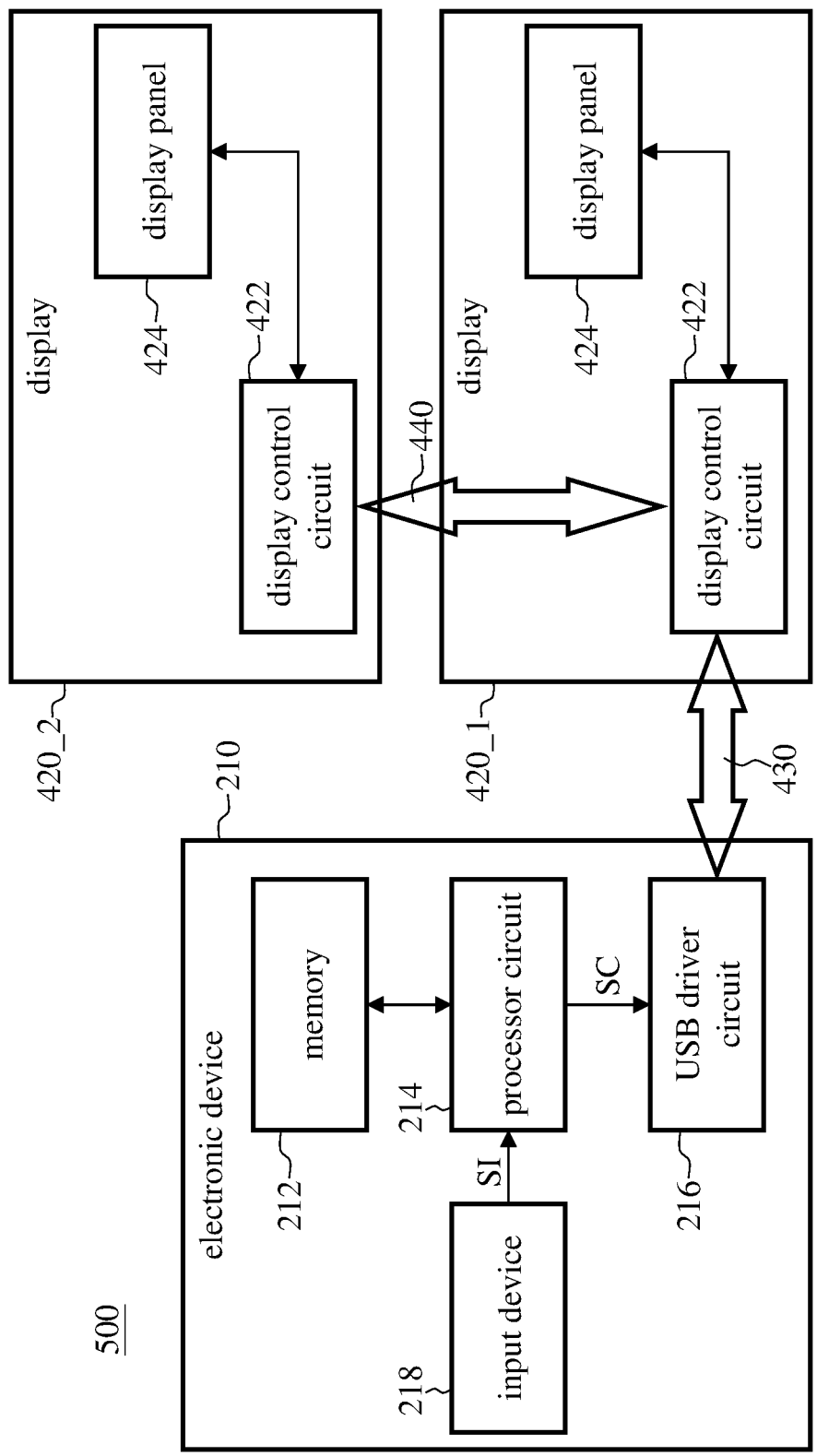
FIG. 7 is a functional block diagram of a display control system according to another embodiment of the present invention.

FIG. 7 is a functional block diagram of a display control system according to another embodiment of the present invention. The display control system 500 includes the electronic device 210, a display 420_1, and a display 420_2. The display 420_1 and the display 420_2 are identical to the display 420 of FIG. 5. In this embodiment, the display control circuit 422 of the display 420_1 and the display control circuit 422 of the display 420_2 are connected through the USB interface 440. Therefore, the control signal SC transmitted by the electronic device 210 to the display 420_1 through the USB interface 430 can be further transmitted to the display 420_2 through the USB interface 440. In some embodiments, the USB interface 440 is a physical USB cable that connects one of the USB ports (e.g., the USB port 428_2) of the display control circuit 422 of the display 420_1 and one of the USB ports (e.g., the USB port 428_1) of the display control circuit 422 of the display 420_2; as a result, a display network of multiple displays can be formed. In this way, the electronic device 210 can control multiple displays at once as long as it is electrically coupled to any display in the display network, which greatly improves the convenience of control and saves time.

To sum up, since the hardware and firmware of the USB driver circuit, USB hub, and USB interface are not updated frequently, the present invention has a higher data transmission stability compared to the conventional method of controlling the display through the graphic driver circuit. Furthermore, when multiple displays are connected through the USB hub(s) to form a display network, the present invention can control multiple displays at once.

The processor circuit 214 and the processor circuit 425 may be circuits or electronic components with program execution capabilities, such as central processing units, microprocessors, microcontrollers, micro processing units, digital signal processors (DSPs), or their equivalents. The processor circuit 214 and the processor circuit 425 respectively carry out the functions of the electronic device 210 and the display control circuit 422 by executing the program codes (or program instructions) stored in the memory 212 or the memory 426. In other embodiments, people having ordinary skill in the art can design the processor circuit 214 and the processor circuit 425 according to the above discussions; that is to say, the processor circuit 214 and the processor circuit 425 may be application specific integrated circuits (ASICs) or embodied by circuits or hardware such as programmable logic devices (PLDs).

Although the foregoing embodiments are exemplified by the I$^2$C bus, this is not a limitation to the present invention. People having ordinary skill in the art can use other types of signal interfaces or formats to implement the embodiments according to the discussions made above.

Please note that the shape, size, and ratio of any element in the disclosed figures are exemplary for understanding, not for limiting the scope of this invention.

The aforementioned descriptions represent merely the preferred embodiments of the present invention, without any intention to limit the scope of the present invention thereto. Various equivalent changes, alterations, or modifications based on the claims of the present invention are all consequently viewed as being embraced by the scope of the present invention.

What is claimed is:

1. A system, comprising:
  a display including:
   a display panel;
   a universal serial bus (USB) circuit configured to receive a control signal in a first format through a USB interface; and
   a display control circuit electrically coupled to the display panel and the USB circuit and configured to receive a control signal in a second format from the USB circuit and control the display panel according to the control signal in the second format; and
  an electronic device electrically coupled to the display through the USB interface and including:
   an input device configured to generate an input signal;
   a USB driver circuit electrically coupled to the USB circuit of the display through the USB interface; and
   a processor circuit electrically coupled to the input device and the USB driver circuit and configured to generate an original control signal according to the input signal and control the USB driver circuit to transmit the control signal in the first format through the USB interface;
  wherein the control signal in the first format and the control signal in the second format are display panel adjustment signals that are not derived from position information of the display panel.

2. The system of claim 1, wherein the USB circuit and the display control circuit are connected through an Inter-Integrated Circuit (I$^2$C) bus interface, the first format is a USB format, and the second format is an I$^2$C bus format.

3. The system of claim 1, wherein the display is a first display, the display panel is a first display panel, the USB circuit is a first USB circuit, the display control circuit is a first display control circuit, and the USB interface is a first USB interface, the system further comprising:

a second display, including:
  a second display panel;
  a second USB circuit electrically coupled to the first USB circuit through a second USB interface and configured to receive the control signal in the first format through the second USB interface; and
  a second display control circuit electrically coupled to the second display panel and the second USB circuit and configured to receive the control signal in the second format from the second USB circuit and control the second display panel according to the control signal in the second format.

4. The system of claim 1, wherein the control signal in the first format and the control signal in the second format are brightness adjustment signals.

5. The system of claim 1, wherein the control signal in the first format and the control signal in the second format are contrast adjustment signals.

6. The system of claim 1, wherein the control signal in the first format and the control signal in the second format are color adjustment signals.

7. A system, comprising:
  a display, including:
    a display panel; and
    a display control circuit electrically coupled to the display panel, wherein the display control circuit includes a universal serial bus (USB) circuit control circuit which provides a USB port electrically coupled to a USB interface, and the display control circuit receives a control signal in a first format through the USB interface and controls the display panel according to a control signal in a second format; and
  an electronic device which is electrically coupled to the display through the USB interface and includes:
    an input device that generates an input signal;
    a USB driver circuit electrically coupled to the display control circuit of the display through the USB interface; and
    a processor circuit electrically coupled to the input device and the USB driver circuit and configured to generate an original control signal according to the input signal and control the USB driver circuit to transmit the control signal in the first format through the USB interface;
  wherein the control signal in the first format and the control signal in the second format are display panel adjustment signals that are not derived from position information of the display panel.

8. The system of claim 7, wherein the processor circuit is a first processor circuit, the display control circuit further comprising:
  a second processor circuit electrically coupled to the USB circuit control circuit;
  wherein the second processor circuit and the USB circuit control circuit are connected through an Inter-Integrated Circuit ($I^2C$) bus interface, the first format is a USB format, and the second format is an $I^2C$ bus format.

9. The system of claim 7, wherein the display is a first display, the display panel is a first display panel, the display control circuit is a first display control circuit, the USB port is a first USB port, the USB circuit control circuit is a first USB circuit control circuit, and the USB interface is a first USB interface, the system further comprising:
  a second display, including:
    a second display panel; and
    a second display control circuit electrically coupled to the second display panel, wherein the second display control circuit includes a second USB circuit control circuit which provides a second USB port electrically coupled to a second USB interface, and the second display control circuit is electrically coupled to the first display control circuit through the second USB port and the second USB interface;
  wherein the second display control circuit receives the control signal in the first format through the second USB interface and controls the second display panel according to the control signal in the second format.

10. The system of claim 7, wherein the control signal in the first format and the control signal in the second format are brightness adjustment signals.

11. The system of claim 7, wherein the control signal in the first format and the control signal in the second format are contrast adjustment signals.

12. The system of claim 7, wherein the control signal in the first format and the control signal in the second format are color adjustment signals.

13. A display, comprising:
  a display panel;
  a universal serial bus (USB) circuit configured to receive a control signal in a first format through a USB interface; and
  a display control circuit electrically coupled to the display panel and the USB circuit and configured to receive a control signal in a second format from the USB circuit and control the display panel according to the control signal in the second format;
  wherein the control signal in the first format and the control signal in the second format are display panel adjustment signals that are not derived from position information of the display panel.

14. The display of claim 13, wherein the USB circuit and the display control circuit are connected through an Inter-Integrated Circuit ($I^2C$) bus interface, the first format is a USB format, and the second format is an $I^2C$ bus format.

15. The display of claim 13, wherein the control signal in the first format and the control signal in the second format are brightness adjustment signals.

16. The display of claim 13, wherein the control signal in the first format and the control signal in the second format are contrast adjustment signals.

17. The display of claim 13, wherein the control signal in the first format and the control signal in the second format are color adjustment signals.

\* \* \* \* \*